US011144239B2

United States Patent
Kito et al.

(10) Patent No.: US 11,144,239 B2
(45) Date of Patent: Oct. 12, 2021

(54) STORAGE CONTROLLER, STORAGE DEVICE, AND WRITE CONTROL METHOD

(71) Applicant: Kabushiki Kaisha Toshiba, Minato-ku (JP)

(72) Inventors: Toshiyuki Kito, Kodaira (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 24 days.

(21) Appl. No.: 16/055,327

(22) Filed: Aug. 6, 2018

(65) Prior Publication Data

US 2019/0050165 A1 Feb. 14, 2019

(30) Foreign Application Priority Data

Aug. 9, 2017 (JP) .............................. JP2017-154390

(51) Int. Cl.
*G06F 3/06* (2006.01)

(52) U.S. Cl.
CPC .......... *G06F 3/0658* (2013.01); *G06F 3/0619* (2013.01); *G06F 3/0656* (2013.01); *G06F 3/0679* (2013.01)

(58) Field of Classification Search
CPC .... G06F 3/0658; G06F 3/0619; G06F 3/0656; G06F 3/0679
See application file for complete search history.

(56) References Cited

U.S. PATENT DOCUMENTS

| 5,463,382 A * | 10/1995 | Nikas ................. H04W 84/025 340/7.22 |
| 6,389,340 B1 * | 5/2002 | Rayner .................... B60R 1/00 340/438 |
| 7,941,258 B1 * | 5/2011 | Mittelsteadt .......... G07C 5/008 340/438 |
| 2002/0116588 A1 | 8/2002 | Beckert et al. |
| 2004/0212941 A1 * | 10/2004 | Haas .................. H04N 1/00127 361/90 |
| 2009/0193182 A1 | 7/2009 | Nitta |
| 2009/0235038 A1 | 9/2009 | Sartore |

(Continued)

FOREIGN PATENT DOCUMENTS

| JP | 2000-128030 | 5/2000 |
| JP | 2003-069936 | 3/2003 |

(Continued)

OTHER PUBLICATIONS

A smart living security page describing voice commands as a convenient hands-free tool for alarm monitoring. (Year: 2016).*

*Primary Examiner* — William E. Baughman
*Assistant Examiner* — Janice M. Girouard
(74) *Attorney, Agent, or Firm* — Oblon, McClelland, Maier & Neustadt, L.L.P.

(57) ABSTRACT

According to an embodiment, a storage controller includes a collector and a controller. The collector is configured to collect data to be written in nonvolatile storage. The controller is configured to perform controlling such that a first time length between collecting data and writing the collected data in the nonvolatile storage after an emergency prediction notice is received is shorter than a second time length between collecting data and writing the collected data in the nonvolatile storage before the emergency prediction notice is received.

10 Claims, 14 Drawing Sheets

(56) References Cited

U.S. PATENT DOCUMENTS

| | | | |
|---|---|---|---|
| 2012/0173594 A1* | 7/2012 | Jogand-Coulomb | G06F 3/064 707/812 |
| 2013/0145085 A1* | 6/2013 | Yu | G06F 12/0246 711/103 |
| 2014/0098228 A1* | 4/2014 | Plante | H04N 7/181 348/148 |
| 2015/0082099 A1* | 3/2015 | Meir | G06F 11/3058 714/47.3 |
| 2017/0090948 A1* | 3/2017 | Waidhofer | G06F 13/4282 |
| 2017/0091042 A1* | 3/2017 | Chou | G06F 12/0804 |
| 2017/0180676 A1* | 6/2017 | Oien | G06F 3/0623 |
| 2018/0211648 A1* | 7/2018 | Nagai | G07C 5/00 |

FOREIGN PATENT DOCUMENTS

| | | |
|---|---|---|
| JP | 2006-256457 A | 9/2006 |
| JP | WO 2009/107836 A1 | 9/2009 |
| JP | 2009-236026 A | 10/2009 |
| JP | 2010-079825 | 4/2010 |
| JP | 2011-175379 A | 9/2011 |
| JP | 2014-186466 | 10/2014 |
| JP | 2016-100672 | 5/2016 |
| JP | 2017-004306 | 1/2017 |

* cited by examiner

STORAGE CONTROLLER, STORAGE DEVICE, AND WRITE CONTROL METHOD

CROSS-REFERENCE TO RELATED APPLICATIONS

This application is based upon and claims the benefit of priority from Japanese Patent Application No. 2017-154390, filed on Aug. 9, 2017; the entire contents of which are incorporated herein by reference.

FIELD

Embodiments described herein relate generally to a storage controller, a storage device, and a write control method.

BACKGROUND

To analyze a situation involved in an automotive accident, for example, information on a vehicle onboard network, information received from, and transmitted to, the outside of the vehicle, information relating to processing of an electronic control unit (ECU), information relating to environment surrounding the vehicle as acquired by sensors, and other types of information serve useful data. Research has therefore been underway in which the foregoing types of data are written and stored as logs in a nonvolatile storage (memory), such as a solid state drive (SSD) and an embedded multimedia card (eMMC). The storage that stores the logs is required to offer a service life corresponding to use environment. Any storage mounted in vehicles, for example, is required to remain usable over an extended period of time, e.g., about 15 years to allow for the vehicle lifecycle.

The types of memories, such as the SSD and the eMMC that include NAND flash memories as their storage media, have a service life affected by frequency at which data is written. Thus, the service life of the storage can be extended by temporarily holding in a volatile area a predetermined amount of data to be written in the storage before the data is later written in the storage. A power interruption can, however, be anticipated in emergencies such as in an automotive accident. In such cases, data held in the volatile area is lost before being written in the storage and types data having greater importance including those collected immediately before the accident occurred cannot be recorded. A need thus exists for capability of effectively preventing data from being lost in emergencies, while extending the service life of the nonvolatile storage.

DETAILED DESCRIPTION

According to an embodiment, a storage controller includes a collector and a controller. The collector is configured to collect data to be written in nonvolatile storage. The controller is configured to perform controlling such that a first time length between collecting data and writing the collected data in the nonvolatile storage after an emergency prediction notice is received is shorter than a second time length between collecting data and writing the collected data in the nonvolatile storage before the emergency prediction notice is received.

The following describes, with reference to the accompanying drawings, a storage controller, a storage device, and a write control method according to an embodiment. The following example describes an exemplary application of the embodiment to storage of data that is useful for analyzing, for example, a situation involved in an automotive accident, but it is illustrative only and not limiting.

Figure 1:
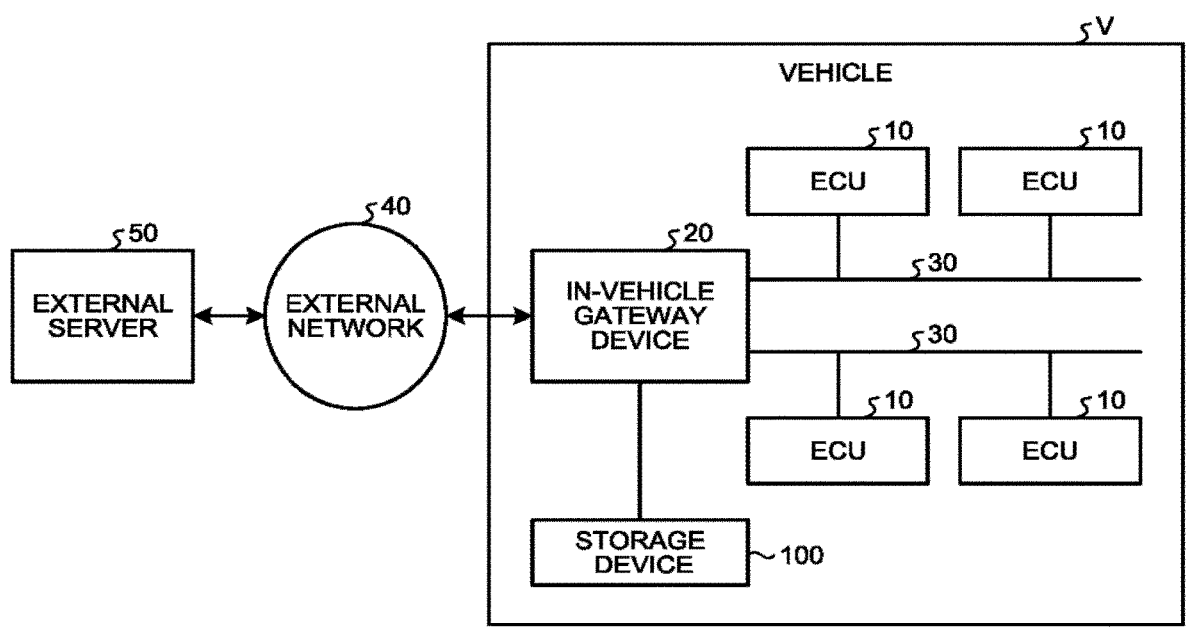
FIG. 1 is a system configuration diagram for illustrating an exemplary application of a storage device according to an embodiment.

FIG. 1 is a system configuration diagram for illustrating an exemplary application of a storage device 100 according to the embodiment. As illustrated in FIG. 1, the storage device 100 is mounted in, for example, a vehicle V. The vehicle V includes various types of ECUs 10 disposed therein. The vehicle V further includes a vehicle onboard network built therein. The vehicle onboard network enables at least the ECUs 10 to communicate via a network bus 30 and an in-vehicle gateway device 20.

The ECUs 10 control various types of devices mounted in the vehicle V. The devices to be controlled include, but are not limited to, motion-related devices of the vehicle V such as an engine, energy-related devices such as a fuel supply system, body-related devices such as windows and doors, and entertainment-related devices such as an audio system. The ECUs 10 may each communicate with other ECUs 10 on the vehicle onboard network in order to control a specific device to be controlled. Alternatively, the ECUs 10 may each control a specific device to be controlled using data of a sensor connected to the ECU 10.

The in-vehicle gateway device 20 is connected with each of the ECUs 10 via the network bus 30 and relays communication, for example, with the ECUs 10 across different network buses 30. Additionally, the in-vehicle gateway device 20 connects with an external server 50 via an external network 40 such as the Internet to thereby perform such functions as transmitting information provided by the external server 50 to the ECUs 10 and transmitting information output by the ECUs 10 to the external server 50.

The storage device 100 in the embodiment is connected, for example, with the in-vehicle gateway device 20 and stores as a log various types of data input to the in-vehicle gateway device 20. It is noted that the storage device 100 may be connected with the ECU 10 in addition to the in-vehicle gateway device 20. When connected with the ECU 10, the storage device 100 stores, for example, data input to the ECU 10 or data that represents results of processing performed by the ECU 10. The storage device 100 may be alternatively configured as being disposed inside the in-vehicle gateway device 20 or the ECU 10.

Figure 2:
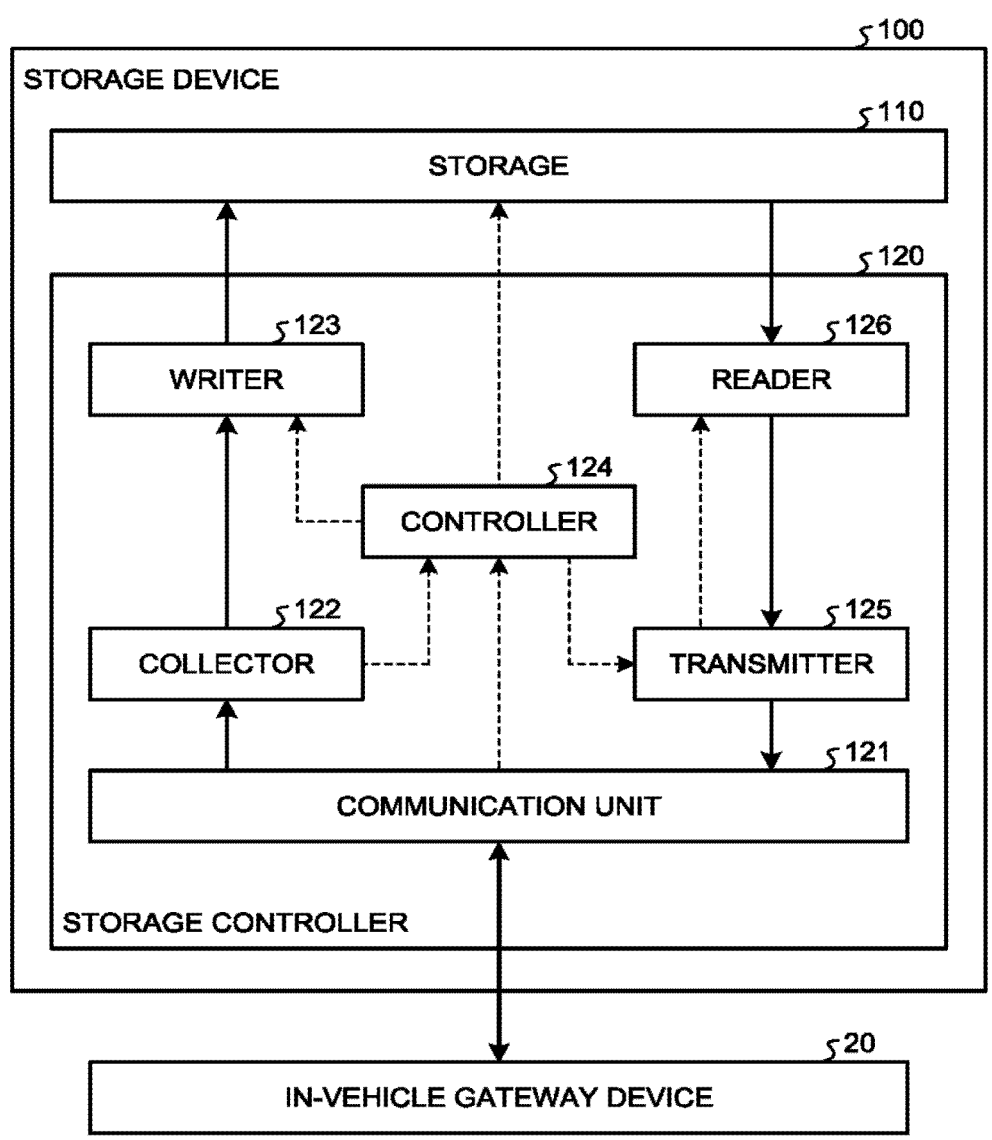
FIG. 2 is a block diagram of an exemplary functional configuration of the storage device in the embodiment.
Figure 3:
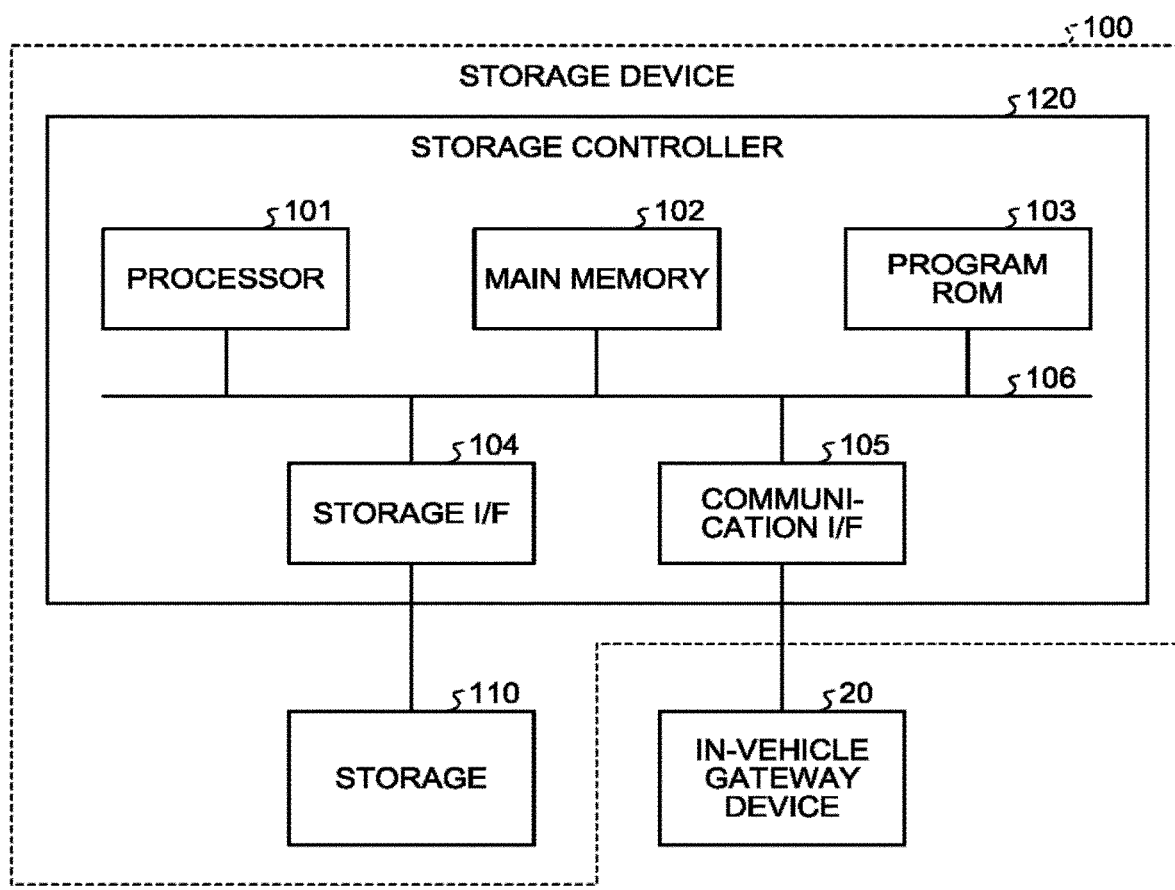
FIG. 3 is a block diagram of a hardware configuration of the storage device in the embodiment.

FIG. 2 is a block diagram of an exemplary functional configuration of the storage device 100 in the embodiment. FIG. 3 is a block diagram of a hardware configuration of the storage device 100 in the embodiment. As illustrated in FIGS. 2 and 3, the storage device 100 includes a storage 110 and a storage controller 120.

The storage 110 is a nonvolatile storage (memory) that does not lose any data stored therein even when power is interrupted. A storage device, such as an SSD or an eMMC that uses a NAND flash memory as its storage medium may, for example, be used as the storage 110.

The storage controller 120 includes, as illustrated in FIG. 3, for example, a processor (processor circuit) 101 such as a central processing unit (CPU), a main memory 102 such as a random access memory (RAM), a program read only memory (ROM) 103 storing a control program, a storage interface (I/F) 104 for connecting with the storage device (storage) 110, and a communication I/F 105 for communicating with the in-vehicle gateway device 20. The storage controller 120 has a hardware configuration in which the foregoing elements are connected with each other via a bus 106. The processor 101, for example, uses the main memory 102 as a work area to execute the control program stored in the program ROM 103, thereby achieving the internal functional components of the storage controller 120 illustrated in FIG. 2.

Specifically, the storage controller 120 includes, as functional elements achieved by the hardware and software illustrated in FIG. 3, a communication unit 121, a collector 122, a writer 123, a controller 124, a transmitter 125, and a read module 126, as illustrated in FIG. 2. It is noted that the storage controller 120 may be configured so as to achieve part or all of the foregoing functional elements using dedicated hardware such as an application-specific integrated circuit (ASIC) or a field-programmable gate array (FPGA).

The communication unit 121 performs a function of exchanging data with the in-vehicle gateway device 20. The communication unit 121, for example, receives from the in-vehicle gateway device 20 various types of data input to the in-vehicle gateway device 20. The various types of data include, but are not limited to, information on the vehicle onboard network, information received from, and transmitted to, the outside of the vehicle, information relating to processing of the ECU 10, and information relating to environment surrounding the vehicle as acquired by sensors.

When an emergency prediction notice is output from any of the ECUs 10 on the vehicle onboard network, for example, the communication unit 121 receives this emergency prediction notice via the in-vehicle gateway device 20 and transmits the emergency prediction notice to the controller 124. The emergency prediction notice indicates that occurrence of an emergency in the vehicle V has been predicted. The emergencies include, but are not limited to, occurrence of an accident of the vehicle V, a fault or failure developed by the ECU 10, and a fault or failure developed by a device to be controlled by the ECU 10. The emergency prediction notice may also be output when a driver suddenly brakes.

The collector 122 performs a function of collecting the various types of data input to the in-vehicle gateway device 20. The collector 122 collects the data through either of the following methods: specifically, by actively collecting the data input to the in-vehicle gateway device 20 and by making a data acquisition request to which the ECU 10, for example, responds. The data collected by the collector 12 is held in a volatile area. When an amount of data held in the volatile area reaches a predetermined amount, the collector 122 transmits a collection completion notice to the controller 124.

The writer 123 performs a function of writing the data collected by the collector 122 as a log in the storage 110. The writer 123 writes data through either of the following two schemes: specifically, an ordinary write scheme (first scheme) through which the writer 123 writes data in the storage 110 when the amount of data collected by the collector 122 and held in the volatile area reaches the predetermined amount and an extraordinary write scheme (second scheme) through which the writer 123 writes data in the storage 110 regardless of the amount of data held in the volatile area (e.g., writing data collected by the collector 122 from time to time as required).

Figure 4:
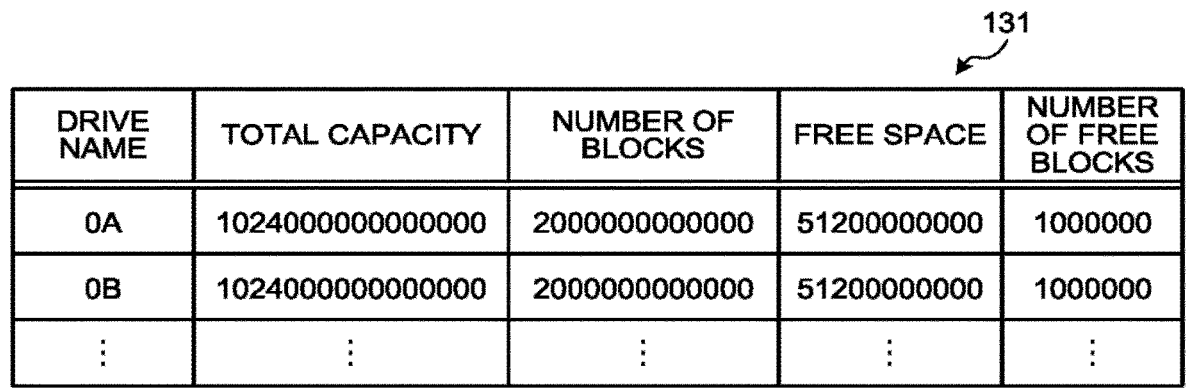
FIG. 4 is a diagram of an exemplary area control table.
Figure 5:
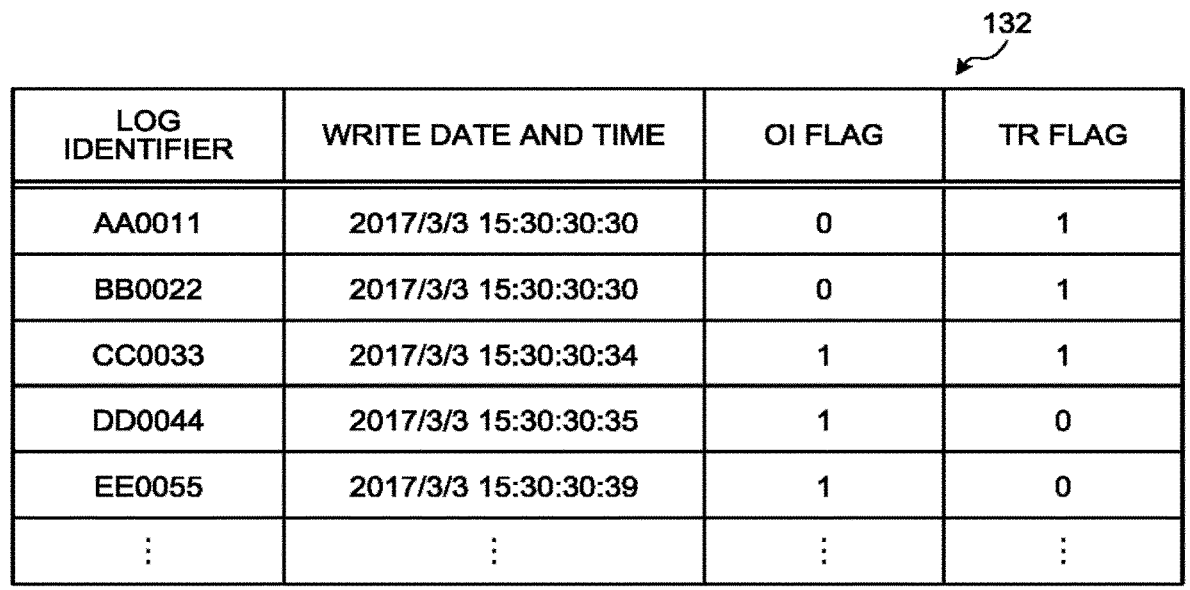
FIG. 5 is a diagram of an exemplary log control table.

The controller 124 performs a function of controlling general operations of the storage device 100, while identifying a state of the storage 110. The state of the storage 110 is controlled, for example, using an area control table 131 as illustrated in FIG. 4 and a log control table 132 as illustrated in FIG. 5.

The area control table 131 controls capacity of the storage 110. As illustrated in FIG. 4, the area control table 131 stores, for each of drives constituting the storage 110, a drive name, total capacity, the number of blocks, free space, and the number of free blocks. The free space and the number of free blocks are detected from time to time by, for example, a control function of the storage 110 and values of the area control table 131 are updated accordingly. The exemplary area control table 131 illustrated in FIG. 4 assumes that the storage 110 includes a plurality of drives. When the storage 110 includes only a single drive, the area control table 131 stores the total capacity, number of blocks, free space, and number of free blocks of that particular drive.

The log control table 132 controls the logs written in the storage 110. As illustrated in FIG. 5, for example, the log control table 132 stores, for each of the logs written in the storage 110, a log identifier that identifies a log, write date and time, an value of OI flag, and a value of TR flag. The OI flag is a flag indicating that overwriting of the logs is inhibited and the logs are held permanently in the storage 110. In the exemplary log control table 132 illustrated in FIG. 5, a value of "0" is stored when the OI flag is set to false (default/preset) and the value is changed from "0" to "1" when the OI flag is set to true (turned on). The TR flag is a flag indicating that the log has been transmitted to the outside (e.g., the external server 50 illustrated in FIG. 1). In the exemplary log control table 132 illustrated in FIG. 5, the value of "0" is stored when the log is yet to be transmitted (default) and the value is changed from "0" to "1" when the log has been transmitted to the outside.

Each time the writer 123 writes data collected by the collector 122 in the storage 10, an entry relating to the log is added accordingly to the log control table 732. When the log written in the storage 110 is deleted from the storage 110, the entry relating to that particular log is deleted from the log control table 132.

The controller 124, for example, refers to the area control table 131 and the log control table 132 to thereby determine the free space in the storage 110 and the logs recorded in the storage 110. When the free space in the storage 110 decreases to a low level, the controller 124 performs such control operations as transmitting a log transmission request notice to the transmitter 125 to thereby cause the log recorded in the storage 110 to the outside and deleting logs that are no longer necessary from the storage 110.

It is noted that, when the free space in the storage 110 becomes scarce (the free space in the storage 110 is equal to or smaller than a predetermined value), the controller 124 may cause the communication unit 121 to transmit to the in-vehicle gateway device 20 a record-disabled notice that indicates that the storage device 100 in a state of being unable to record data. The record-disabled notice is, for example, broadcast from the in-vehicle gateway device 20 to each of the ECUs 10 via the network bus 30. The ECU 10, having received the record-disabled notice, recognizes that the storage device 100 is in the state of being unable to record data, so that the ECU 10 can perform such processing to hold the data to be transmitted to the network bus 30 in an internal storage (memory) of the ECU 10 in place of the storage 110 of the storage device 100.

Additionally, the controller 124 controls writing of data by the writer 123. When the abovementioned emergency prediction notice is received from the communication unit 121, in particular, the controller 124 performs controlling such that a first time length between collecting data and writing the collected data in the nonvolatile storage after an emergency prediction notice is received is shorter than a second time length between collecting data and writing the collected data in the nonvolatile storage before the emergency prediction notice is received.

Specifically, when the controller 124 receives from the collector 122 the collection completion notice that indicates that the amount of data held in the volatile area reaches a predetermined amount, the controller 124 transmits a write notice to the writer 123 to thereby control such that the writer 123 writes the data in the storage 110 through the ordinary write scheme described previously. When the controller 124 receives the above-described emergency prediction notice via the communication unit 121, the controller 124 transmits the extraordinary write notice to the writer 123 to thereby control such that the writer 123 writes the data in the storage 110 through the extraordinary write scheme described previously. Specifically, when the emergency prediction notice is received, the controller 124 changes over the write scheme for the writer 123 from the ordinary write scheme to the extraordinary write scheme.

The OI flag described previously is set to true, for example, for the log written in the storage 110 through the extraordinary write scheme. Alternatively, the OI flag may be set to true for, in addition to the log written in the storage 110 through the extraordinary write scheme, the log written in the storage 110 through the ordinary write scheme for a predetermined period of time from when the write scheme of the writer 123 is changed over from the ordinary write scheme to the extraordinary write scheme. The OI flag may be set to true by the controller 124 or by the writer 123 each time data is written in the storage 110 by the writer 123 and a new entry is added to the log control table 132.

The transmitter 125 has a function of transmitting the log recorded in the storage 110 to the outside (e.g., the external server 50). The transmitter 125, having received the log transmission request notice from the controller 124, requests the read module 126 to read a log yet to be transmitted. In response to the request, the read module 126 reads a log from the storage 110, and the transmitter 125 transmits the log to the outside via the communication unit 121.

The read module 126 has a function of reading the log from the storage 110. In response to a request from the transmitter 125, for example, the read module 126 reads from the storage 110 a log that is yet to be transmitted to the outside out of the logs stored in the storage 110 and passes that specific log onto the transmitter 125.

Figure 6:
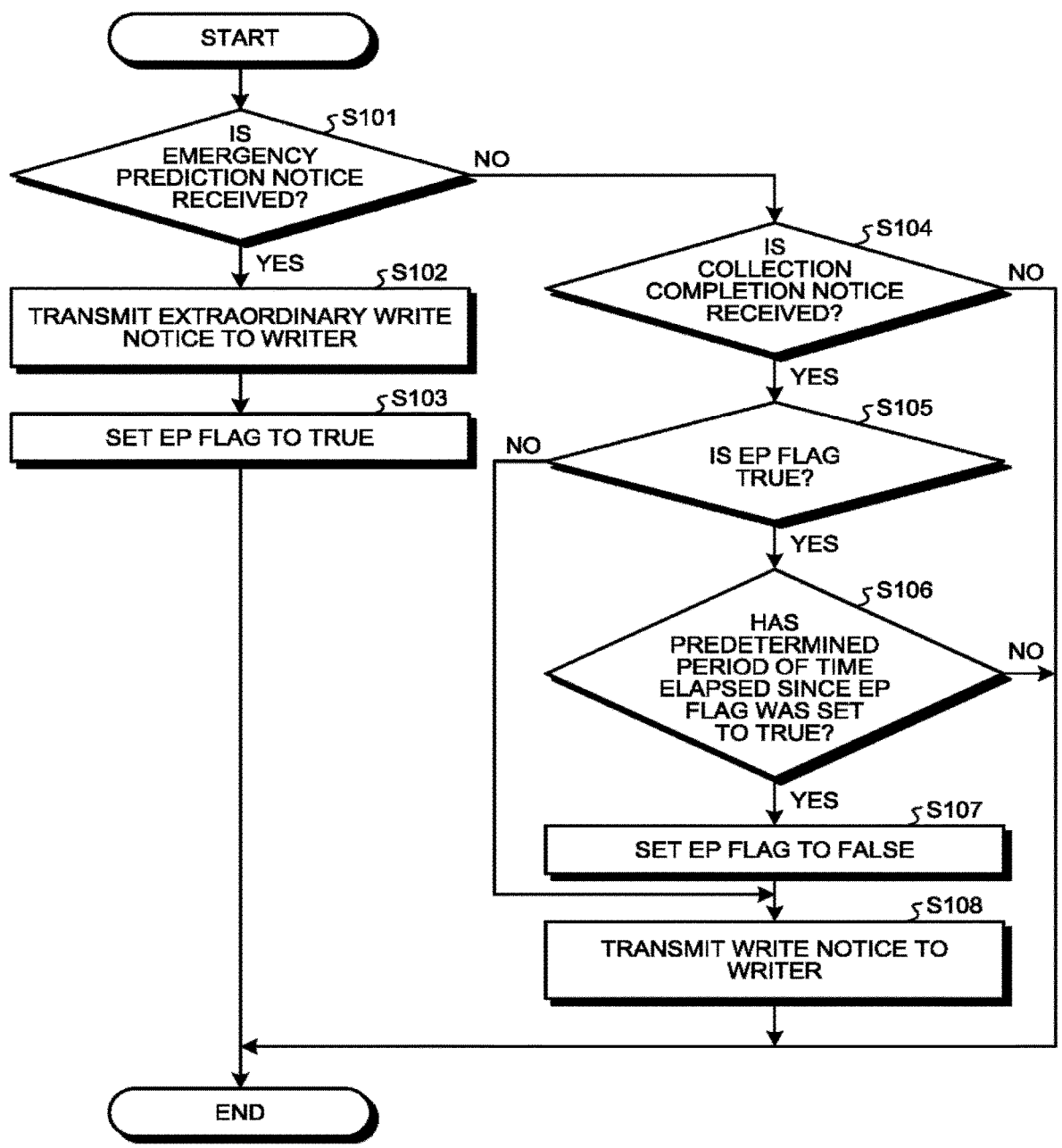
FIG. 6 is a flowchart of an exemplary write control process performed by a controller.

The following describes, with reference to a flowchart, operations of the storage device 100 in the embodiment. FIG. 6 is a flowchart of an exemplary write control process performed by the controller 124. The process illustrated in the flowchart of FIG. 6 is performed each time the controller 124 receives an interrupt notice.

Upon receipt of an interrupt notice, the controller 124 determines whether the received interrupt notice is an emergency prediction notice or a collection completion notice (Step S101 and Step S104). If it is determined that the received interrupt notice is the emergency prediction notice (Yes at Step S101), the controller 124 transmits an extraordinary write notice to the writer 123 (Step S102), sets an EP flag to true (Step S103), and terminates the process. The EP flag is a flag indicating that the controller 124 has received an emergency prediction notice. If the EP flag is true, counting is started of an elapsed time since the reception of the emergency prediction notice.

In contrast, if it is determined that the received interrupt notice is the collection completion notice from the collector 122 (No at Step S101 and Yes at Step S104), the controller 124 determines whether the EP flag is true (Step S105). If it is determined that the EP flag is true is at Step S105), the controller 124 determines whether a predetermined period of time has elapsed since the EP flag was set to true (Step S106). If the predetermined period of time is yet to elapse since the EP flag was set to true (No at Step S106), the process is terminated. It is noted that if the received interrupt notice is neither the EP flag nor the collection completion notice (No at Step S104), the controller 124 terminates the process without performing write control.

In contrast, if the predetermined period of time has elapsed since the EP flag was set to true (Yes at Step S106), the controller 124 sets the EP flag to false (turned off) (Step S107), transmits a write notice to the writer 123 (Step S108), and terminates the process. If the EP flag is not true at Step S105 (No at Step S105), the controller 124 also transmits a write notice to the writer 123 (Step S108) and terminates the process.

Figure 7:
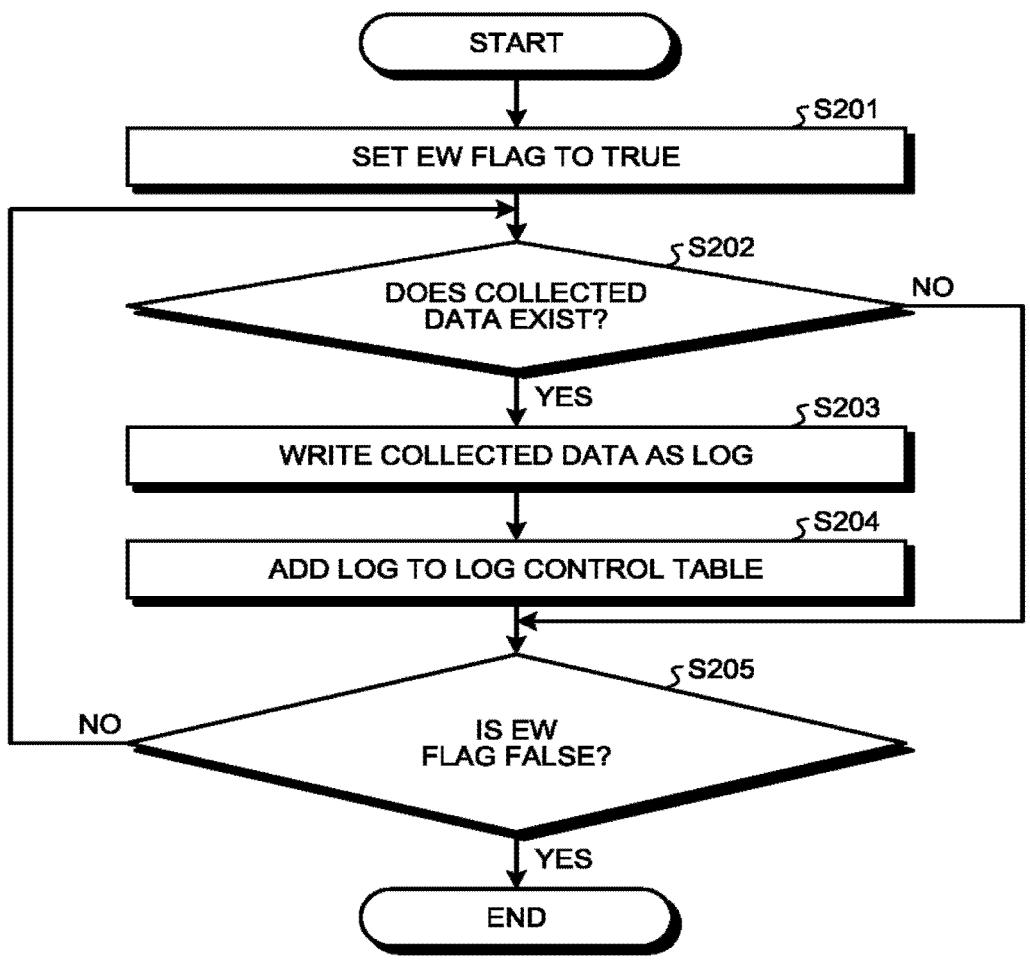
FIG. 7 is a flowchart of an exemplary process performed by a writer to write data through an extraordinary write scheme.

FIG. 7 is a flowchart of an exemplary process performed by the writer 123 to write data in the storage 110 through the extraordinary write scheme. The process illustrated in the flowchart of FIG. 7 is initiated upon receipt by the writer 123 of an extraordinary write notice from the controller 124.

The writer 123, having received an extraordinary write notice from the controller 124, sets an EW flag to true (Step S201). The EW flag indicates that the data is written through the extraordinary write scheme.

The writer 123 then determines whether data collected by the collector 122 exists (Step S202). If data collected by the collector 122 exists (Yes at Step S202), the writer 123 writes the data collected by the collector 122 as a log in the storage 110 (Step S203). Then, the writer 123 adds an entry relating to the written log to the log control table 132 to thereby update the log control table 132 (Step S204). At this time, the OI flag is set to true for the written log.

In contrast, if data collected by the collector 122 does not exist (No at Step S202), the processing at Step S203 and Step S204 is not performed, and the process advances to Step S205. At Step S205, it is determined whether the EW flag has been set to false. The EW flag is set to false, as will be described later, upon receipt by the writer 123 of a write notice from the controller 124. If the EW flag is yet to be set to false (No at Step S205), the process returns to Step S202 and repeats the processing at Step S202 and the subsequent steps. The process is terminated, if the EN flag is set to false (Yes at Step S205).

Figure 8:
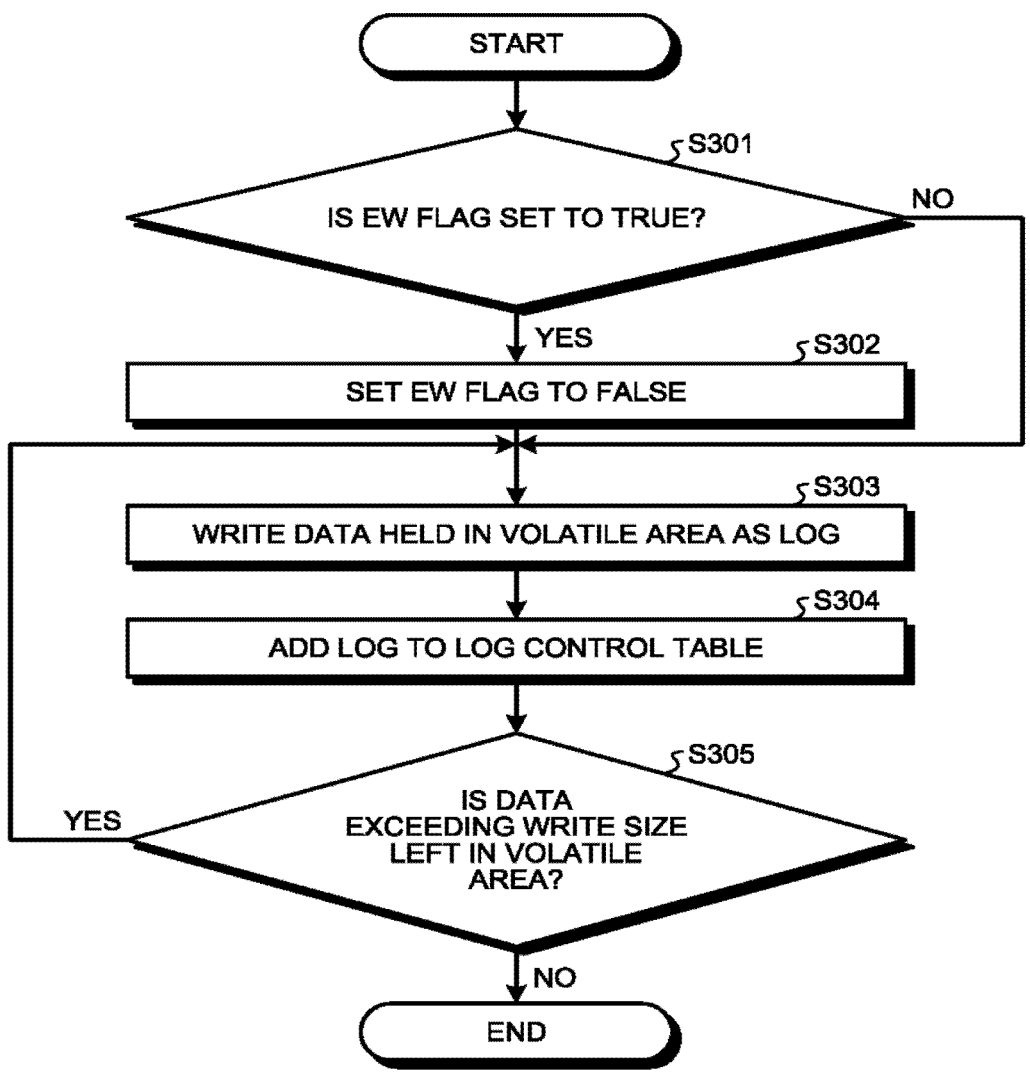
FIG. 8 is a flowchart of an exemplary process performed by the writer to write data through an ordinary write scheme.

FIG. 8 is a flowchart of an exemplary process performed by the writer 123 to write data in the storage 110 through the ordinary write scheme. The process illustrated in the flowchart of FIG. 8 is initiated upon receipt by the writer 123 of a write notice from the controller 124.

The writer 123, having received a write notice from the controller 124, determines whether an EW flag is true (Step S301). If the EN flag is true (Yes at Step S301), the EN flag is set to false (Step S302).

The writer 123 then writes data collected by the collector 122 and held in the volatile area as a log in the storage 110 (Step S303). Then, the writer 123 adds an entry relating to the written log to the log control table 132 to thereby update the log control table 132 (Step S304). At this time, the OI flag is set to false for the written log.

An amount of data collected by the collector 122 and held in the volatile area is greater than an amount of data to be written by the writer 123 in the storage 110 at ore time (write size). Thus, to write data through the ordinary write scheme in the storage 110, the writer 123 repeatedly performs an operation to write data in units of the write size in the storage 110. Specifically, the writer 123 determines whether data exceeding the write size is left in the volatile area (Step S305) and, if the data exceeding the write size is left in the volatile area (Yes at Step S355), the process returns to Step S303, and the writer 123 performs the processing at Step S303 and the subsequent steps repeatedly. If the amount of data left in the volatile area is less than the write size at Step S305), the process is terminated.

Figure 9:
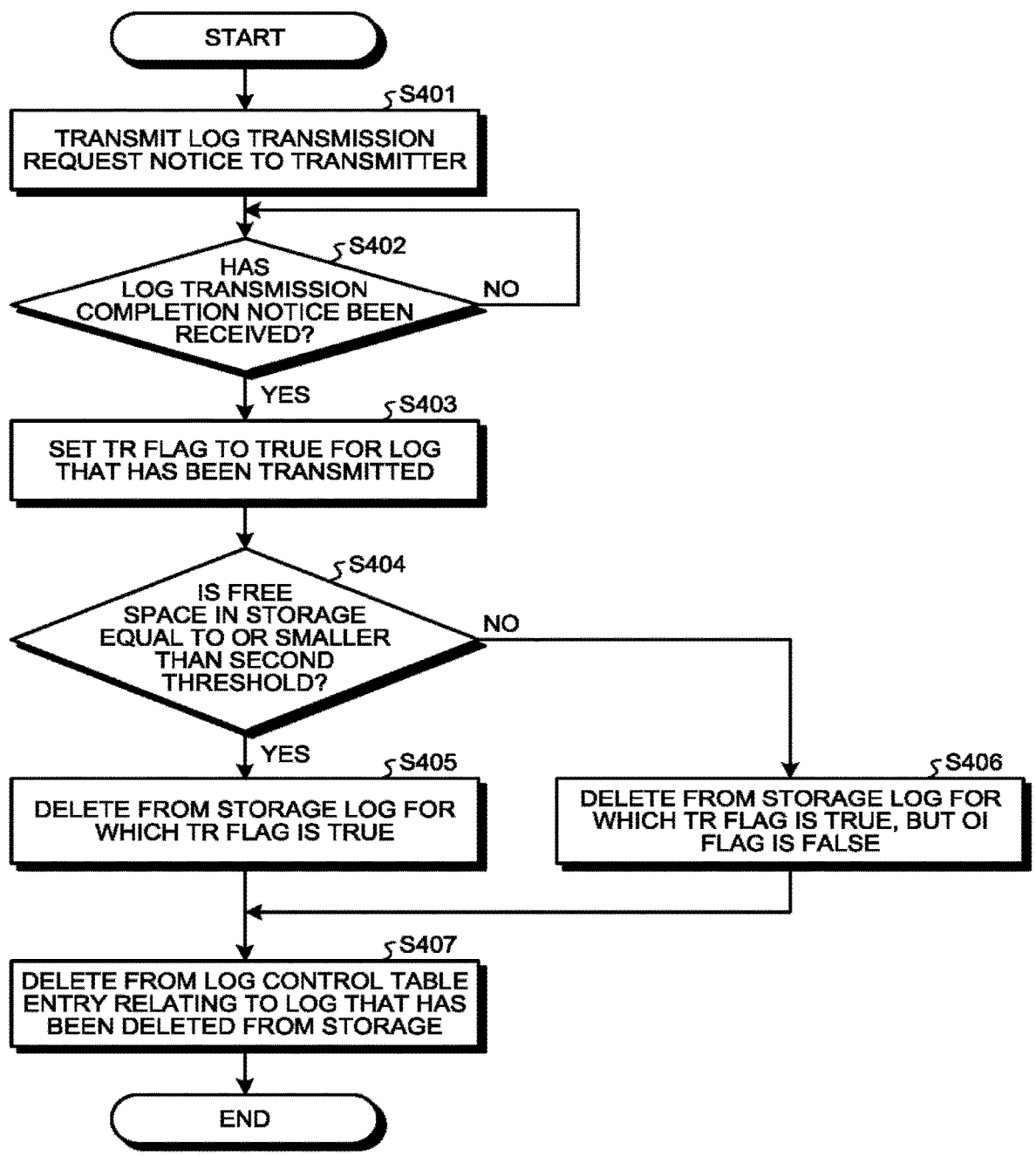
FIG. 9 a flowchart of an exemplary transmission control process performed by the controller.

FIG. 9 is a flowchart of an exemplary transmission control process performed by the controller 124. The process illustrated in the flowchart of FIG. 9 is initiated when the free space in the storage 110 is equal to or smaller than a first threshold. The free space in the storage 110 is detected, for example, by referring to the area control table 131 described previously.

When the free space in the storage 110 is equal to or smaller than the first threshold, the controller 124 transmits a log transmission request notice to the transmitter 125 (Step S401). The controller 124 thereafter waits until a log transmission completion notice is received from the transmitter 125 (No at Step S402). If the log transmission completion notice is received (Yes at Step S402), the controller 124 sets the TR flag to true for the log that has been transmitted to the outside (Step S403).

The embodiment assumes the external server 50 connected with the external network 40 as the log transmission destination. Thus, when the in-vehicle gateway device 20 is not in an environment in which the in-vehicle gateway device 20 is able to connect with the external network 40, the log may not be transmitted as soon as the controller 124 transmits the log transmission request notice to the transmitter 125, during which period data may be written in the storage 110. Data may also be written in the storage 110 while the log is being transmitted to the external server 50. In such cases, the free space in the storage 110 upon completion of the log transmission may further dwindle before the log transmission.

Upon completion of the log transmission, the controller 124 determines whether the free space in the storage 110 is equal to or smaller than a second threshold that is smaller than the first threshold (Step S404). If the free space in the storage 110 is greater than the second threshold (No at Step S404), the controller 124 deletes from the storage 110 a log for which the TR flag is true and the OI flag is false out of the logs stored in the storage 110 (Step S406).

In contrast, if the free space in the storage 110 is lowered to be equal to or smaller than the second threshold (Yes at Step S404), the controller 124 deletes from the storage 110 all logs for which the TR flag is true, regardless of whether the OI flag is true (Step S405). The controller 124 then deletes from the log control table 122 entries relating to the logs that have been deleted from the storage 110 (Step S407) and terminates the process.

Figure 10:
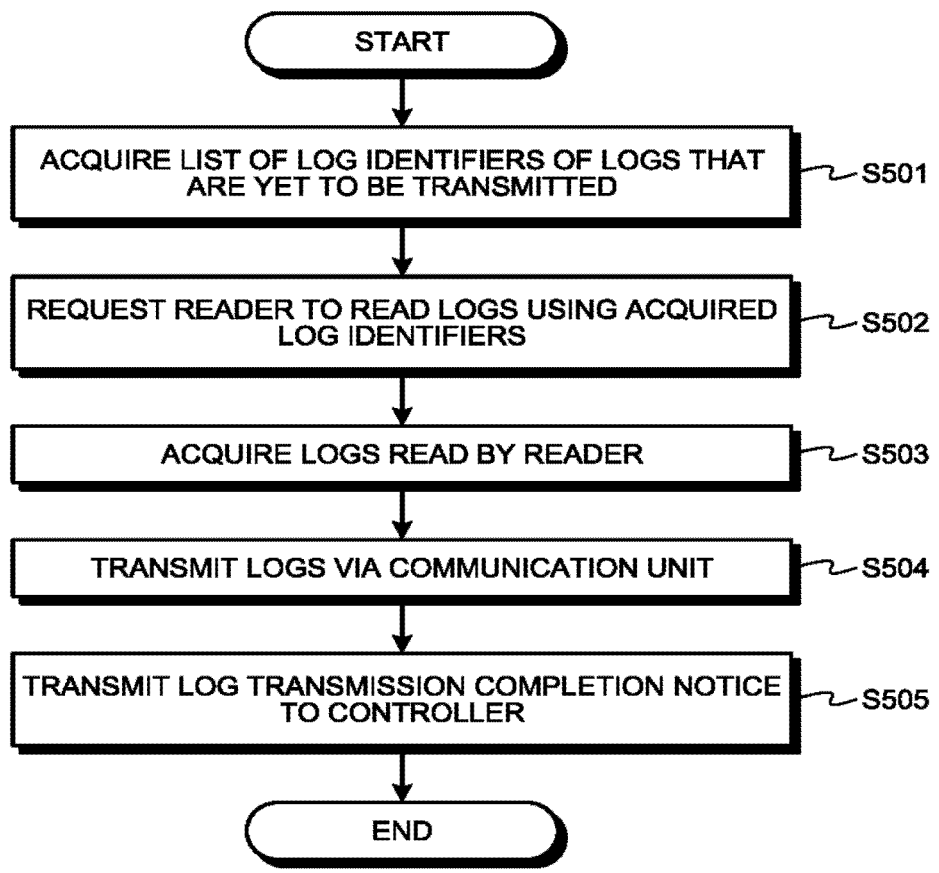
FIG. 10 is a flowchart of an exemplary process performed by a transmitter.

FIG. 10 is a flowchart of an exemplary process performed by the transmitter 125. The process illustrated in the flowchart of FIG. 10 is initiated when the transmitter 125 receives a log transmission request notice from the controller 124.

The transmitter 125, having received the log transmission request notice from the controller 124, refers to the log control table 132 and acquires a list of log identifiers of logs for which the TR flag is false and which are yet to be transmitted (Step S501). The transmitter 125, using the log identifiers contained in the acquired list of log identifiers, requests the read module 126 to read logs that can be identified by the log identifiers (Step S502).

The transmitter 125 thereafter acquires the logs read by the read module 126 from the storage 110 (Step S503) and transmits the logs to the outside via the communication unit 121 (Step S504). For example, a log is transmitted from the communication unit 121 to the in-vehicle gateway device 20 and the log is transmitted from the in-vehicle gateway device 20 to the external server 50 via the external network 40. On completing transmitting the loss, the transmitter 125 transmits a log transmission completion notice to the controller 124 (Step S505) and terminates the process.

As described in detail with reference to specific examples, in the embodiment, before the controller 124 receives the emergency prediction notice, the writer 123 writes data in the storage 110 through the ordinary write scheme after having held a predetermined amount of data collected by the collector 122 in the volatile area. When the controller 124 receives the emergency prediction notice, the writer 123 writes data collected by the collector 122 in the storage 110 immediately through the extraordinary write scheme. Thus, loss of data can be effectively prevented in emergencies, while the service life of the nonvolatile storage 110 is extended.

In addition, the embodiment inhibits overwriting of data (logs) written in the storage 110 through the extraordinary write scheme, or in addition to the data (logs) written in the storage 110 through the extraordinary write scheme, data (logs) written in the storage 110 through the ordinary write scheme for a predetermined period of time after the changeover of the write scheme to the extraordinary write scheme. This arrangement enables logs that are assumed to be useful particularly in analysing, for example, a situation involved in an accident the vehicle V encounters to be held permanently.

Additionally, in the embodiment, the storage 110 is configured to transmit logs held therein to the outside when the free space in the storage 110 becomes scarce. This arrangement effectively prevents logs stored in the storage 110 from being lost by overwriting.

Additionally, in the embodiment, when the free space in the storage 110 becomes scarce, logs that are not inhibited from being overwritten, out of the logs that have been transmitted to the outside, are deleted from the storage 110. When the free space in the storage 110 becomes even scarcer, all logs that have been transmitted to the outside are deleted from the storage 110. This arrangement allows important logs to be held for a long time, while gaining the free space in the storage 110.

The foregoing embodiment is illustrative only and various modifications can be made therein. The following describes these various modifications. In the following description, like elements are identified by like reference numerals and duplicate descriptions will be omitted.

First Modification

The above-described embodiment inhibits overwriting of data (logs) written in the storage 110 through the extraordinary write scheme. Thus, for example, when the emergency prediction notice is transmitted to the controller 124 because of a self-inflicted accident, or even when the emergency prediction notice is transmitted to the controller 124 because of a decision made of failure due to an accidental reason such ac a road surface condition during traveling, overwriting is inhibited of the logs written at that particular time. These logs are, however, less useful in identifying the cause of the accident of the vehicle V to thereby clarify where responsibility lies and thus have a low necessity to be held permanently. Additionally, when these logs are kept inhibited from being overwritten, logs that are inhibited from being overwritten accumulate in the storage 110, occupying some capacity of the storage 110.

Thus, in this first modification, when the write scheme for the writer 123 is returned from the extraordinary write scheme to the ordinary write scheme, the OI flag being true for the data (logs) written so far in a storage 110 through the extraordinary write scheme is set to false upon an instruction given by a user (e.g., a driver of the vehicle V). For example, an inquiry is made to the user as to whether the logs are to be kept held. If no response to keep holding the logs is received, the OI flag for the logs is set to false.

Figure 11:
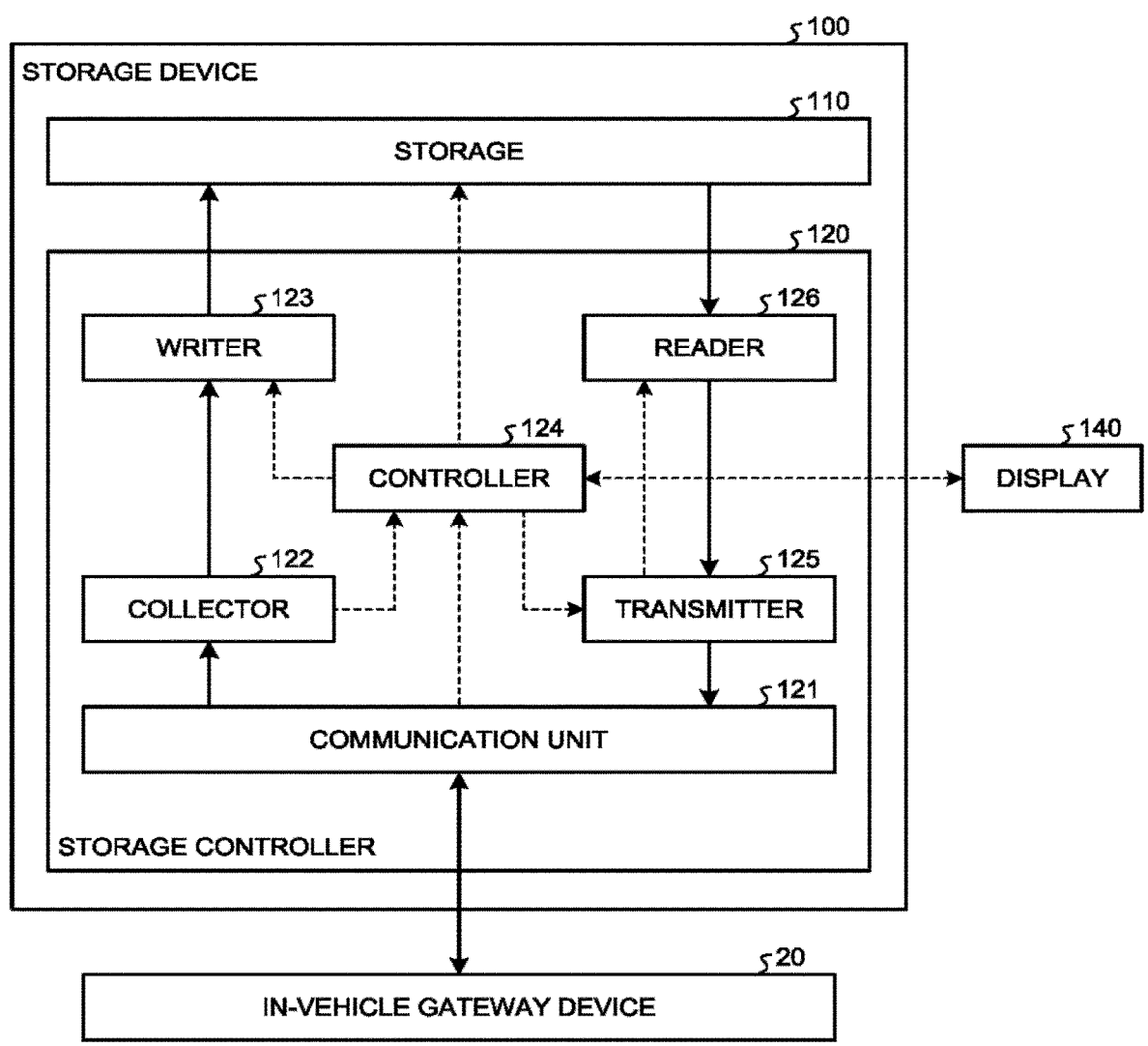
FIG. 11 is a block diagram of an exemplary functional configuration of a storage device in a first modification.

FIG. 11 is a block diagram of an exemplary functional configuration of the storage device 100 in the first modification. The storage device 100 has a configuration identical to the configuration (see FIG. 2) of the storage device 100 in the above-described embodiment, except that the controller 124 in the storage controller 120 is connected with a display 140 as a user interface disposed in the vehicle V. In the first modification, when the write scheme for the writer 123 is returned from the extraordinary write scheme to the ordinary write scheme, the controller 124 causes the display 140 to display a message inquiring whether to keep holding the logs recorded during the current emergency. If no response to keep holding the logs is received, the OI flag is set to false for the data (logs) written in the storage 110 through the extraordinary write scheme prior to the return to the ordinary write scheme.

Figure 12:
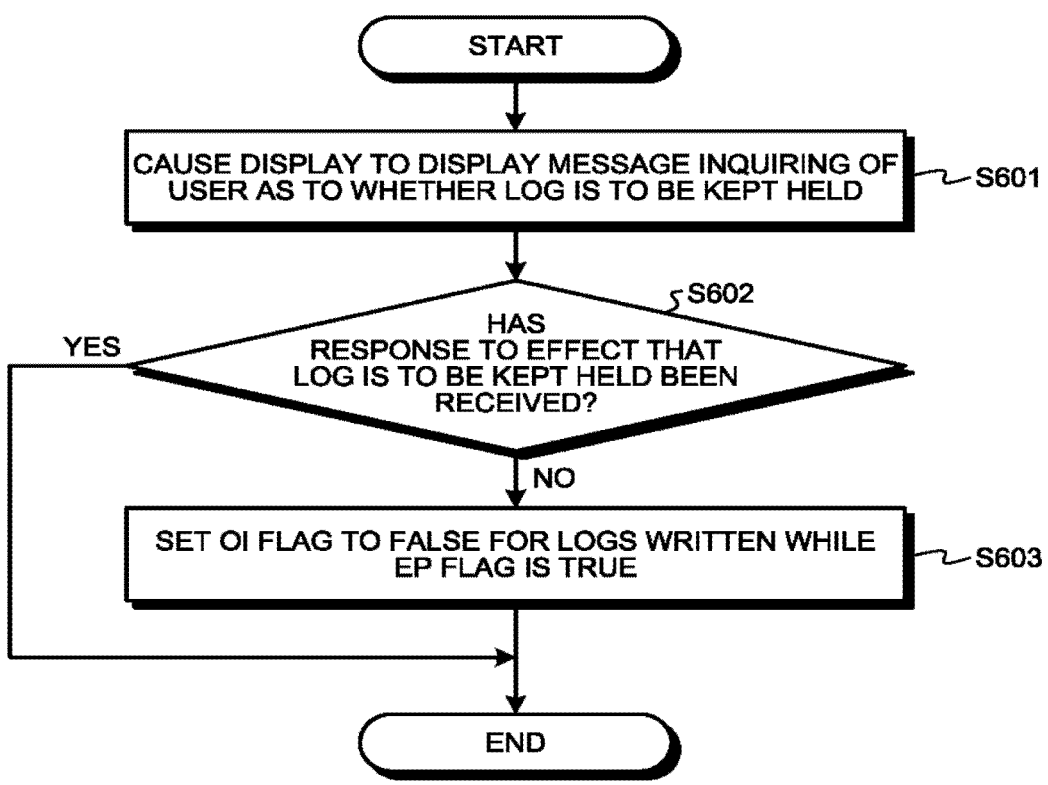
FIG. 12 is a flowchart of an exemplary process performed by a controller in the first modification.

FIG. 12 is a flowchart of an exemplary process performed by the controller 124 in the first modification. The process illustrated in the flowchart of FIG. 12 is initiated when the write scheme for the writer 123 is returned from the extraordinary write scheme to the ordinary write scheme.

When the write scheme for the writer 123 is returned from the extraordinary write scheme to the ordinary write scheme, the controller 124 causes the display 140 to display a message inquiring of the user as to whether the log is to be held (Step S601). If a response to the effect that the log is to be kept held is received from the user (Yes at Step S602), the controller 124 terminates the process without releasing the OI flag. In contrast, if a response to the effect that the log is to be kept held is not received from the user (No at Step S602), the controller 124 sets the OI flag to false for the data (log) written in the storage 110 through the extraordinary write scheme prior to the return to the ordinary write scheme (Step S603) and terminates the process.

In the first modification, the OI flag is set to false to allow overwriting for any log other than the logs which the user determines to be kept held permanently. This arrangement effectively avoids inconvenience of scarce capacity caused by logs that cannot be overwritten and that accumulate in the storage 110.

Second Modification

When the vehicle V encounters an emergency, vehicle interior data is considered generally to be more important than data from the outside of the vehicle V. In the above-described embodiment, the vehicle interior data is not particularly differentiated from the data from the outside of the vehicle V. As a result, upon occurrence of an emergency prediction notice, the data from the outside of the vehicle V can hamper the vehicle interior data having greater importance from being written properly. Thus, a controller 124 in a second modification shuts down the data from the outside of the vehicle V upon receipt of the emergency prediction notice to thereby enable the vehicle interior data to be written properly. Additionally, in the second modification, the controller 124, on receipt of the emergency prediction notice, transmits the vehicle interior data to the outside of the vehicle V, while at the same time writing the vehicle interior data in the storage 110, to thereby prevent loss of the vehicle interior data having greater importance more effectively.

Figure 13:
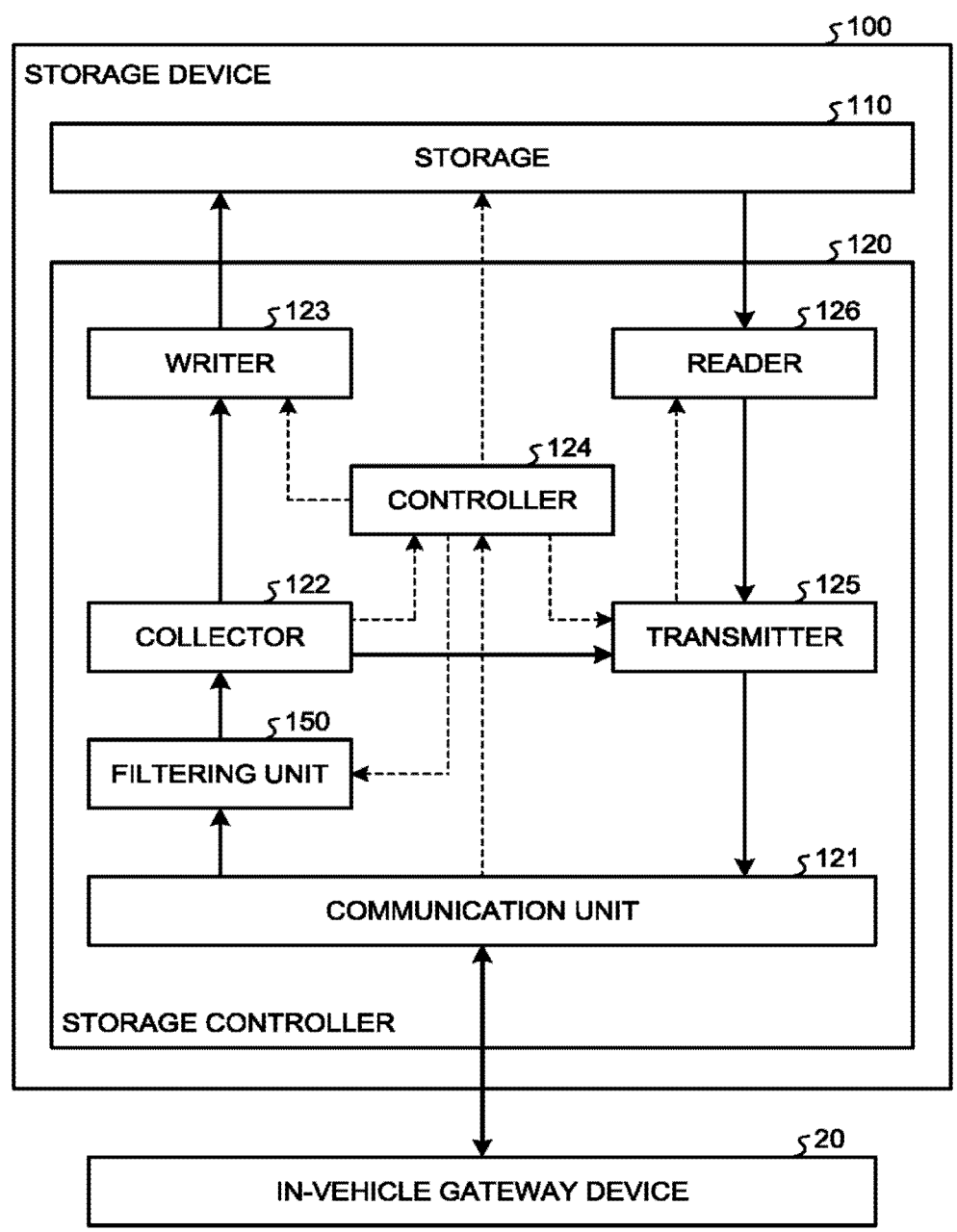
FIG. 13 is a block diagram of an exemplary functional configuration of a storage device in a second modification.

FIG. 13 is a block diagram of an exemplary functional configuration of a storage device 100 in the second modification. As compared with the configuration in the above-described embodiment (see FIG. 2), the storage device 100 in the second modification includes a filtering unit 150 added to a storage controller 120. The filtering unit 150 is activated and deactivated by the controller 124. When activated by the controller 124, the filtering unit 150 shuts down the data from the outside of the vehicle V out of data received by the communication unit 121 until the filtering unit 150 is thereafter deactivated.

The controller 124 in the second modification, upon receipt of an emergency prediction notice, transmits an extraordinary write notice to the writer 123, while activating the filtering unit 150. Upon a lapse of a predetermined period of time after the receipt of the emergency prediction notice when a predetermined period of time elapses after the EP flag is set to true), the controller 124 in the second modification deactivates the filtering unit 150.

Figure 14:
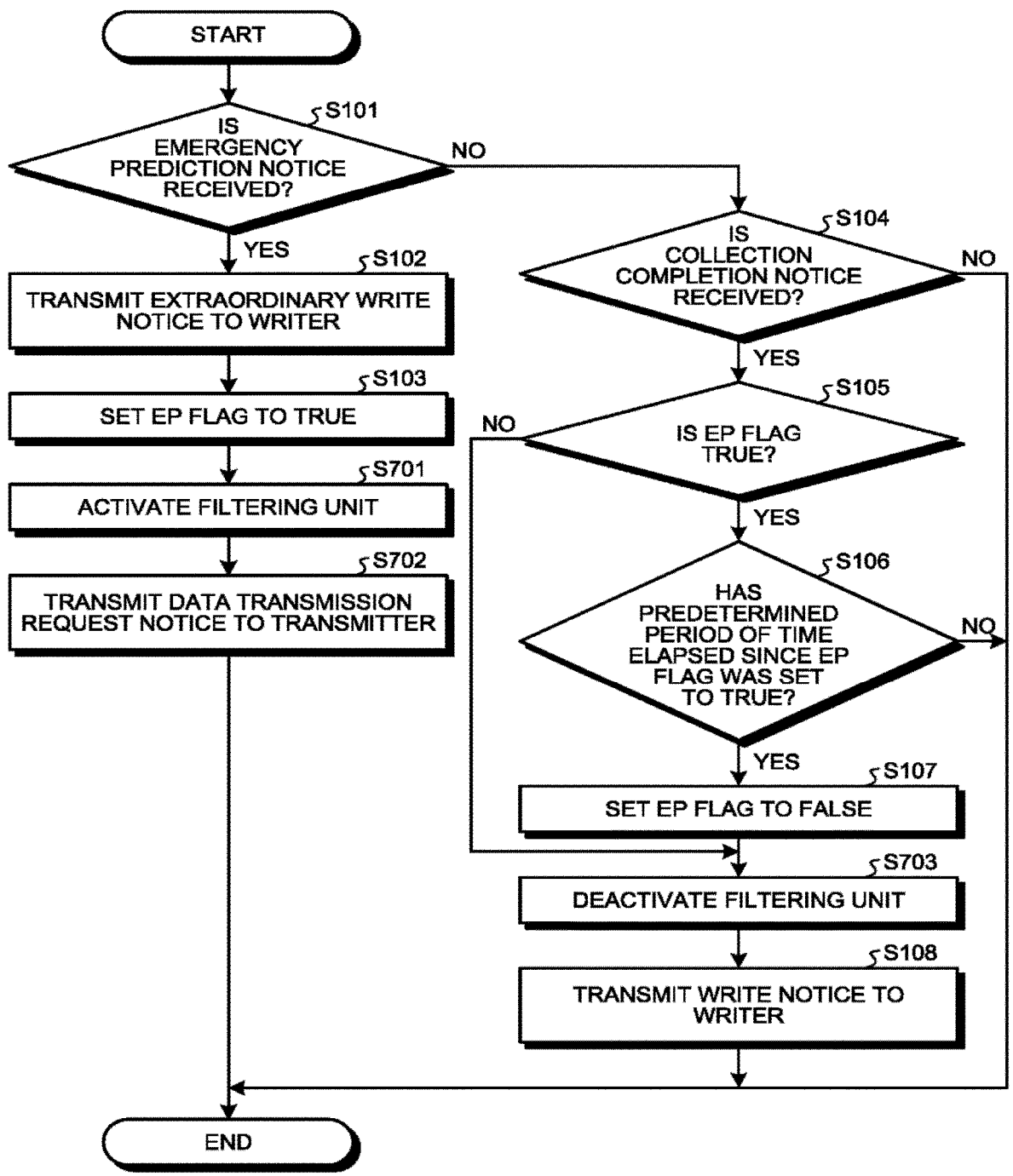
FIG. 14 a flowchart of an exemplary process performed by a controller in the second modification.

FIG. 14 a flowchart of an exemplary process performed by the controller 124 in the second modification. As compared with the flowchart illustrated in FIG. 6, Step S701 and Step S702 are added in the flowchart illustrated in FIG. 14 following Step S103 in the flowchart illustrated in FIG. 6, and Step S703 is inserted in the flowchart illustrated in FIG. 14 between Step S107 and Step S108 in the flowchart illustrated in FIG. 6. The following describes only those steps added in the flowchart illustrated in FIG. 14.

After setting the EP flag to true at Step S103, the controller 124 in the second modification activates the filtering unit 150 (Step S701) to thereby the filtering unit 150 to shut out the data from the outside of the vehicle V. The controller 124 then transmits a data transmission request notice to a transmitter 125 (Step S702 to thereby cause data collected by a collector 122 to be transmitted to the outside.

The controller 124 in the second modification, after having set the EP flag to false at Step S107, deactivates the filtering unit 150 (Step S703) to thereby allow the data from the outside of the vehicle V to be collected also by the collector 122.

Figure 15:
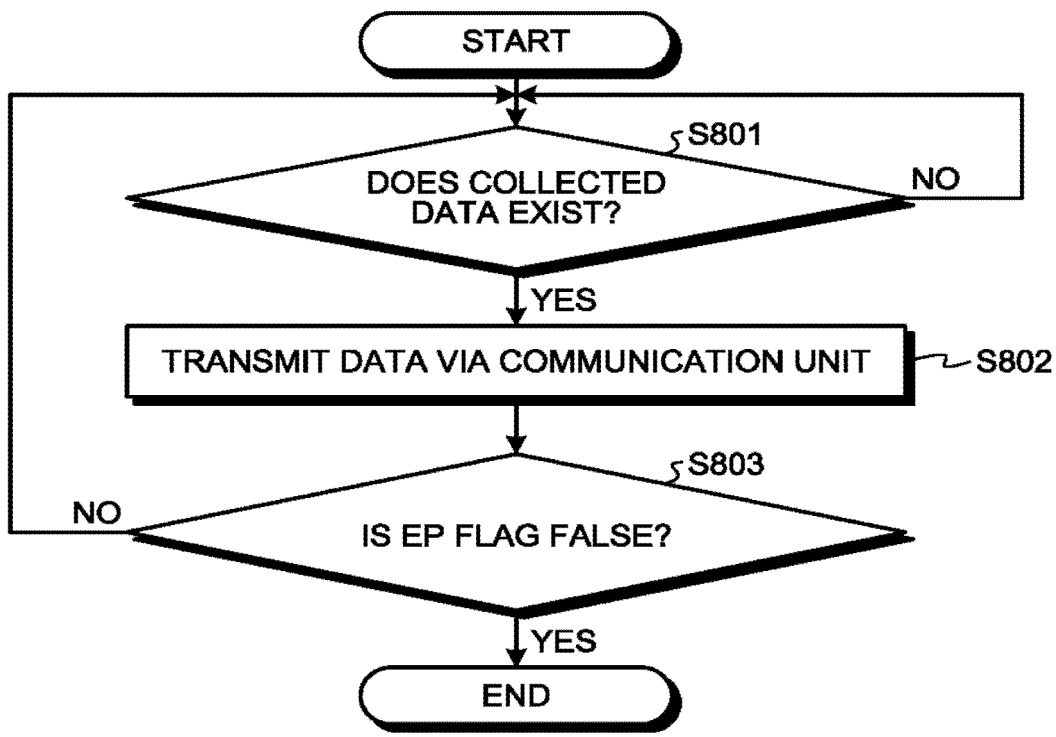
FIG. 15 a flowchart of an exemplary process performed by a transmitter in the second modification.

FIG. 15 a flowchart of an exemplary process performed by the transmitter 125 in the second modification. The series of process illustrated in the flowchart of FIG. 15 is initiated when the transmitter 125 receives the data transmission request notice from the controller 124.

The transmitter 125 in the second modification, having received the data transmission request notice from the controller 124, determines whether data collected by the collector 122 exists (Step S801). If the data collected by the collector 122 exists (Yes at Step S801), the transmitter 125 transmit the data collected by the collector 122 to the outside via the communication unit 121 (Step S802). For example, the data collected by the collector 122 is transmitted to an in-vehicle gateway device 20 from the communication unit 121 and the data is transmitted from the in-vehicle gateway device 20 to an external server 50 via an external network 40.

Thereafter, the transmitter 125 determines whether the EP flag has been set to false (Step S803). If the EP flag is yet to be set to false (No at Step S803), the process returns to Step S801 and the transmitter 125 performs the processing at Step S801 and the subsequent steps repeatedly. If the EP flag is set to false (Yes at Step S803), the process is terminated.

In the second modification, the data from the outside of the vehicle V is shut out while data is being written in the age 110 through the extraordinary write scheme, so that the vehicle interior data having greater importance can be written properly. Additionally, the vehicle interior data, while being written in the storage 110, is also transmitted to the outside of the vehicle V. This arrangement prevents Loss of the vehicle interior data having greater importance even more effectively.

Third Modification

In the above-described embodiment, the OI flag is set to true for the data (logs) written in the storage 110 through the extraordinary write scheme. The logs are thereby prevented from being overwritten. Writing of data performed concurrently with the setting of the OI flag to true, however, increases processing load and the increased processing load is expected to provide a hindrance to correct writing of data upon occurrence of the emergency prediction notice.

As one approach, data (logs) written in the storage 110 may be set into, by default, an overwrite inhibited state and, at a predetermined timing at which the processing load is expectedly low, overwriting may be enabled for data that satisfies a predetermined condition out of the logs stored in the storage 110. For example, in the log control table 132 illustrated in FIG. 5, the "OI flag" is changed to an "OW flag" that indicates overwriting permission and is preset to false, specifically, the overwriting inhibited state. Then, at a timing at which the amount of data to be collected by a collector 122 is assumed to be small, such as when the vehicle V is stationary, the OW flag is set to true for the data (logs) that satisfies a predetermined condition, such as data written in the storage 110 through the ordinary write scheme in the past. Alternatively, as in the first modification described earlier, a message inquiring whether to keep holding the log is displayed in the display 140 and the OW flag may be set to true for a log specified in a response from the user.

Fourth Modification

The above-described embodiment assumes that the storage device, such as the SSD and the eMMC, is used as the storage 110. The storage device may nonetheless be achieved by a storage device 100 that includes the storage 110 and the storage controller 120. In this case, a nonvolatile memory such as a NAND flash memory in the storage device assumes the storage 110 and the storage controller 120 is achieved as a controller inside the storage device.

Fifth Modification

The embodiment has been described for a case in which the storage device 100 is mounted in the vehicle V. The storage device 100 may nonetheless be mounted on any type of moving object other than the vehicle V, such as a train, an aircraft, a watercraft, and a robot. In addition to the example in which the storage device 100 is mounted in the moving object, the storage device 100 may even be incorporated, for example, in a home network system with which home appliances having a communication function are connected. In such other application examples, too, the storage device 100 writes data that is useful for a posterior analysis of failure as a log in the storage 110. Furthermore, by changing over the write scheme in the same manner as in the above embodiment, loss of data in emergencies can be effectively prevented, while the service life of the storage 110 is extended.

According to the storage controller, the storage device, and the write control method of at least one embodiment described above, it is possible to effectively prevent loss of data in emergencies, while extending e service life of a nonvolatile storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage controller comprising:
a hardware processor connected to a nonvolatile memory and configured to:
collect data to be written in the nonvolatile memory;
write the collected data in the nonvolatile memory through a first scheme or a second scheme, the first scheme being a scheme to hold the collected data in a volatile memory and write the collected data in the nonvolatile memory when an amount of data held in the volatile memory reaches a predetermined amount, the second scheme being a scheme to write the collected data in the nonvolatile memory regardless of the amount of data held in the volatile memory;
change over a write scheme for the collected data from the first scheme to the second scheme upon receipt of the emergency prediction notice, and change the second scheme to the first scheme after a predetermined period of time has elapsed since the emergency prediction notice is received;
transmit the data written in the nonvolatile memory to outside through a communication interface;
perform controlling such that a first time length between collecting data and writing the collected data in the nonvolatile memory after an emergency prediction notice is received is shorter than a second time length between collecting data and writing the collected data in the nonvolatile memory before the emergency prediction notice is received;

inhibit overwriting of the data that has been written in the nonvolatile memory through the second scheme;

when free space in the nonvolatile memory is equal to or smaller than a first threshold, execute a first deletion process of deleting, from the nonvolatile memory, the written data that has been transmitted to the outside and that is not inhibited from being overwritten; and after the first deletion process is executed and when free space in the nonvolatile memory becomes equal to or smaller than a second threshold that is smaller than the first threshold, execute a second deletion process of deleting, from the nonvolatile memory, all the written data that have been transmitted to the outside, the all the written data including data that is inhibited from being overwritten.

2. The storage controller according to claim 1, wherein the hardware processor sets a flag indicative of inhibiting overwriting for the data written in the nonvolatile memory through the second scheme.

3. The storage controller according to claim 2, wherein the hardware processors sets an additional flag indicative of inhibiting overwriting for the data written in the nonvolatile memory before a predetermined period of time after the changeover of the write scheme from the first scheme to the second scheme.

4. The storage controller according to claim 1, wherein, when the write scheme is returned from the second scheme to the first scheme, the hardware processor turns off the flag for the data written in the nonvolatile memory in accordance with an instruction given by a user.

5. The storage controller according to claim 1, wherein
the data set in an overwrite inhibited state is written in the nonvolatile memory, and
at a predetermined timing, a flag indicative of permitting overwriting is turned on for the data that satisfies a predetermined condition out of the data written in the nonvolatile memory.

6. The storage controller according to claim 1, wherein the hardware processor transmits the data written in the nonvolatile memory to the outside when the emergency prediction notice is received.

7. The storage controller according to claim 1, wherein
the storage controller is disposed inside a moving object, and
the hardware processor shuts out the data to be collected from outside of the moving object when the emergency prediction notice is received.

8. The storage controller according to claim 1, wherein when free space in the nonvolatile memory is equal to or smaller than a third threshold, the hardware processor transmits a record-disabled notice that indicates a state of being unable to record data so that a device serving as a transmission source of the data is capable of receiving the record-disabled notice, and the device, upon receipt of the record-disabled notice, holds the data in an internal memory.

9. A storage device comprising:
the storage controller according to claim 1; and
the nonvolatile memory.

10. A write control method implemented by a computer, the method comprising:

collecting data to be written ire a nonvolatile memory; and writing the collected data in the nonvolatile memory through a first scheme or a second scheme, the first scheme being a scheme to hold the collected data in a volatile memory and write the collected data in the nonvolatile memory when an amount of data held in the volatile memory reaches a predetermined amount, the second scheme being a scheme to write the collected data in the nonvolatile memory regardless of the amount of data held in the volatile memory;

changing over a write scheme for the collected data from the first scheme to the second scheme upon receipt of the emergency prediction notice, and changing the second scheme to the first scheme after a predetermined period of time has elapsed since the emergency prediction notice is received;

transmitting the data written in the nonvolatile memory to outside;

performing control such that a first time length between collecting data and writing the collected data in the nonvolatile memory after an emergency prediction notice is received is shorter than a second time length between collecting data and writing the collected data in the nonvolatile memory before the emergency prediction notice is received;

inhibiting overwriting of the data that has been written in the nonvolatile memory through the second scheme;

when free space in the nonvolatile memory is equal to or smaller than a first threshold, executing a first deletion process of deleting, from the nonvolatile memory, the written data that has been transmitted to the outside and that is not inhibited from being overwritten; and after the first deletion process is executed and when free space in the nonvolatile memory becomes equal to or smaller than a second threshold that is smaller than the first threshold, executing a second deletion process of deleting, from the nonvolatile memory, all the written data that have been transmitted to the outside, the all the written data including data that is inhibited from being overwritten.

* * * * *